United States Patent [19]
Hohermuth

[11] Patent Number: 5,535,983
[45] Date of Patent: Jul. 16, 1996

[54] FLEXIBLE TUBING PINCHCOCK

[75] Inventor: Kurt Hohermuth, Wädenswil, Switzerland

[73] Assignee: Ho-Matic AG, Affoltern am Albis, Switzerland

[21] Appl. No.: 494,572

[22] Filed: Jun. 22, 1995

[30] Foreign Application Priority Data

Jul. 1, 1994 [EP] European Pat. Off. ............ 94110242

[51] Int. Cl.⁶ ........................................................ F16K 7/07
[52] U.S. Cl. ........................................................ 251/5; 251/4
[58] Field of Search ............................................. 251/4, 5

[56] References Cited

U.S. PATENT DOCUMENTS

| | | | |
|---|---|---|---|
| 3,090,591 | 5/1963 | Clarlison | 251/5 |
| 3,494,588 | 2/1970 | Kisling, III | 251/5 |
| 4,125,125 | 11/1978 | Ezekoye et al. | 137/315 |

FOREIGN PATENT DOCUMENTS

| | | |
|---|---|---|
| 2616045 | 10/1977 | Germany . |
| 3221225 | 8/1983 | Germany . |
| 321639 | 5/1957 | Switzerland . |

*Primary Examiner*—John C. Fox
*Attorney, Agent, or Firm*—Jacobson, Price, Holman & Stern

[57] ABSTRACT

The sleeve is inserted into the passage of the valve casing and fastened to the valve casing by means of a bayonet connection at one end and by means of a support arrangement at the other end. The fastening collar embedded in the sleeve body has projecting lugs. The latter can be moved through grooves on insertion with the sleeve into the valve casing. The holding collar has a flange which on the insertion of the sleeve comes to bear against the support surface of the valve casing. When the sleeve is then turned, the lugs engage behind the holding surface of the valve casing. This permits extremely simple installation and replaceability of the sleeve.

14 Claims, 2 Drawing Sheets

Fig. 1

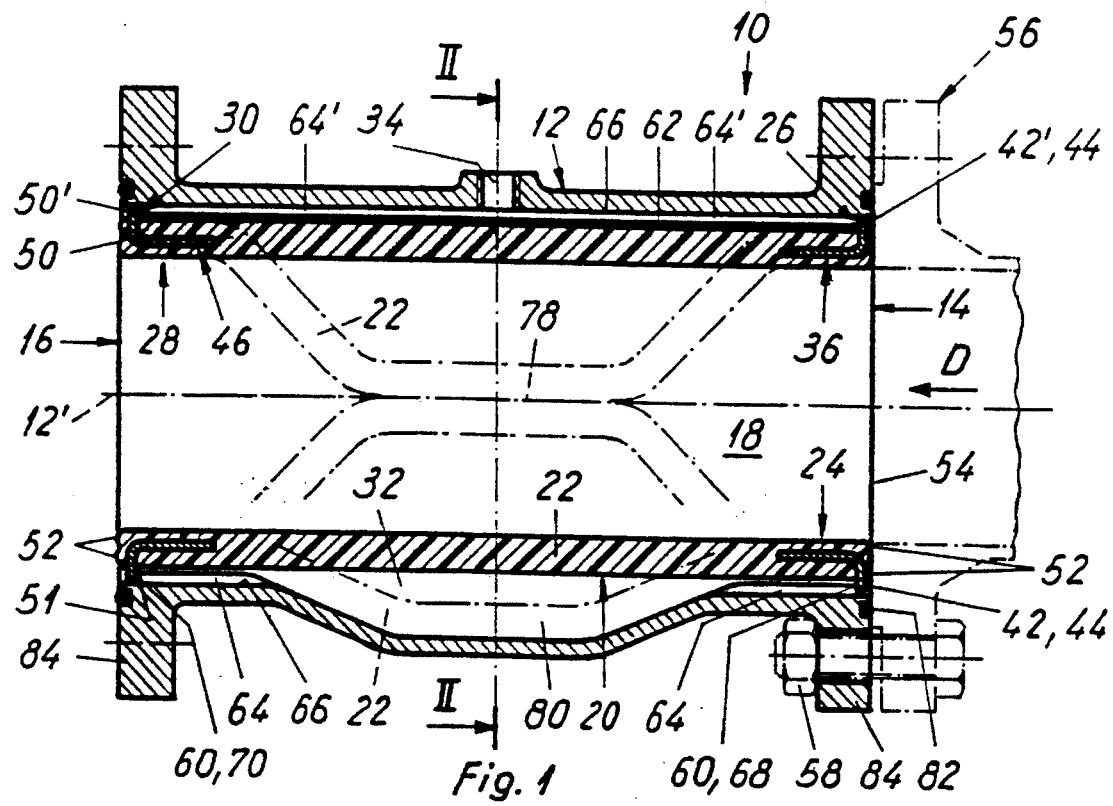
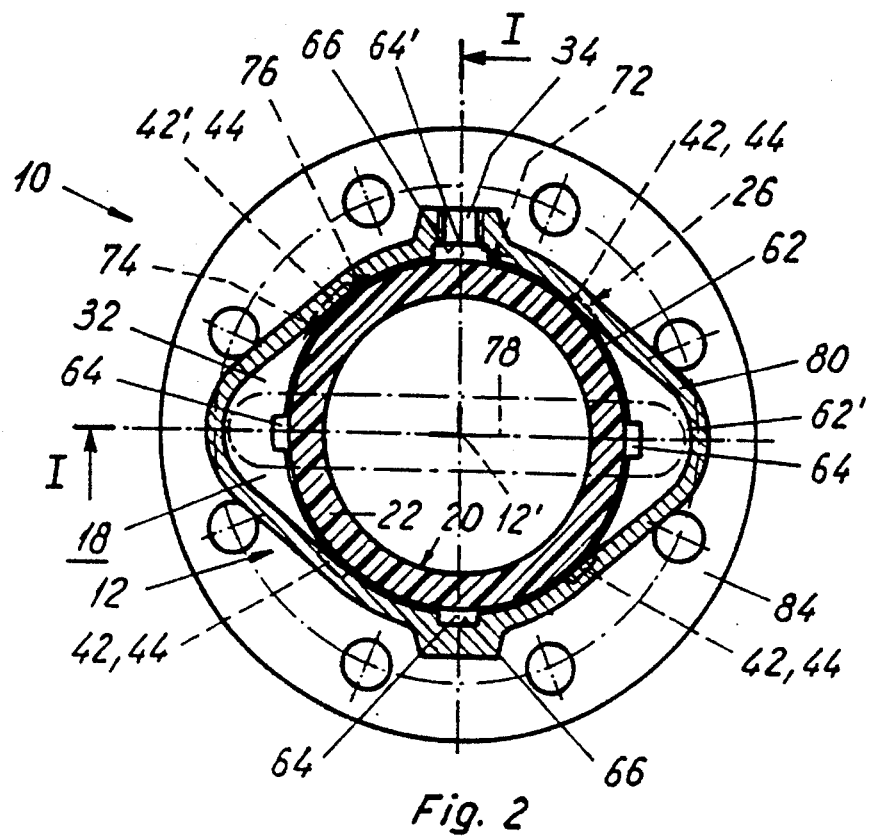

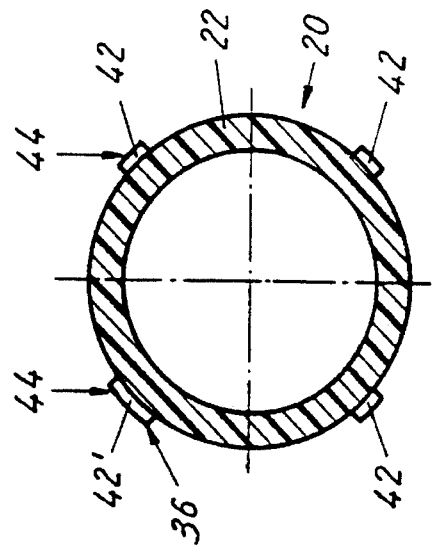
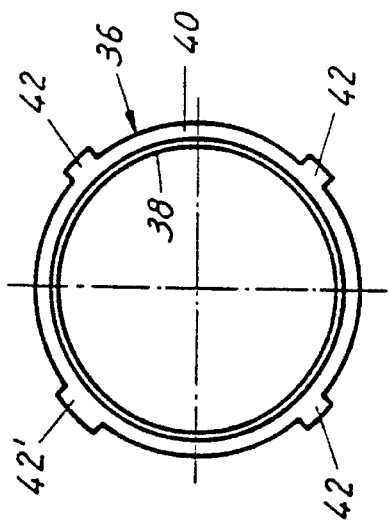
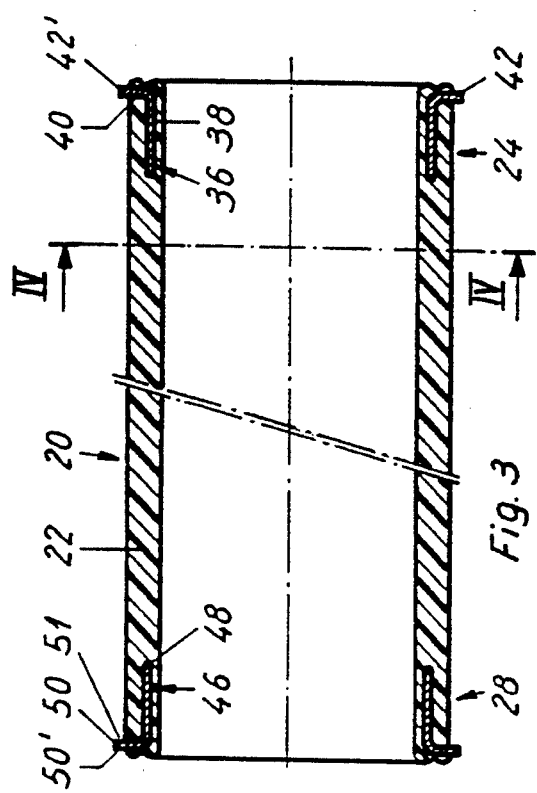
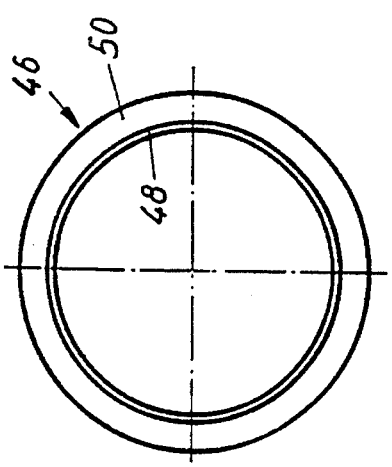
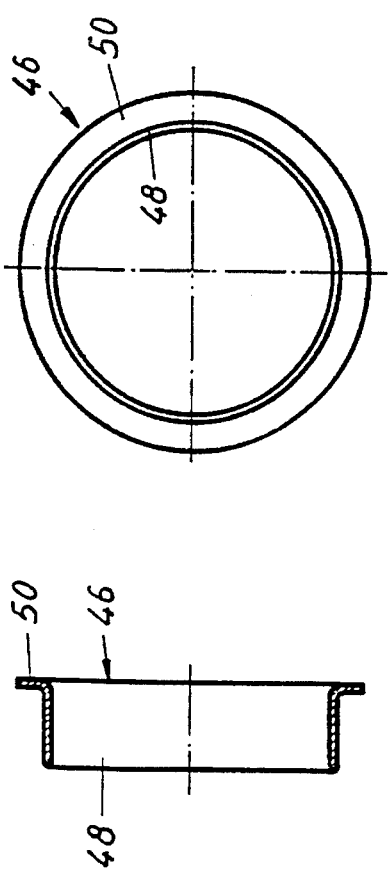

FLEXIBLE TUBING PINCHCOCK

BACKGROUND OF THE INVENTION

1. Field of the invention

The present invention relates to a pinchcock having a valve casing which has an inlet, an outlet and a passage connecting the inlet and outlet to each other. A sleeve is arranged in the passage and has a sleeve body of elastic material and which is intended to receive the flow of a medium passing through it from the inlet to the outlet or vice versa. Means are provided for fastening the sleeve body to the valve casing in two fastening regions situated at a distance from one another in the longitudinal direction of the passage. A control space is provided which is bounded by the valve casing and the sleeve body and which, for the purpose of pinching together the sleeve body between the two fastening regions, can be placed under a pressure higher than that of the medium.

2. Description of the Prior Art

A pinchcock of this kind is disclosed in DE-A-26 16 045. This pinchcock has a valve casing through the passage of which a sleeve of elastic material passes. Circumferential holding grooves, which are inwardly open in the radial direction, are provided in the valve casing in the two end regions of said passage. Tensioning rings are inserted into the sleeve for its installation, and are then expanded to fasten the sleeve to the valve casing and for that purpose force parts of the sleeve into the holding grooves. The expansion of the tensioning rings, which in the unstressed state have end regions overlapping one another, viewed in the circumferential direction, until in the stressed state the ends abut each other, can be possible only with special tools, since not only do the tensioning rings have to be expanded but at the same time the sleeve must also be compressed. Dismantling of the tensioning rings, for example in order to replace the sleeve, must also entail similar problems.

SUMMARY OF THE INVENTION

It is therefore an object of the present invention to provide a pinchcock of the type defined which, while simple in construction, permits easy installation and the replaceability of the sleeve on the site without special tools being required.

This object is achieved with a pinchcock of the type defined herein. More specifically, according to the invention the sleeve body is fastened at one end by means of a bayonet connection and at the other end by means of a support arrangement to the valve casing, the bayonet connection and the support arrangement acting in opposite directions pointing away from each other. This permits the insertion of the sleeve into the valve casing and the making of the connection solely by turning or sliding the sleeve relative to the valve casing. Without the aid of tools the fastening can thus be effected and also released again quickly and in a simple manner. The valve casing can have a one-piece construction and, other than the sleeve body, the pinchcock requires no further parts which come into contact with the medium. Any constriction of the cross section of flow can thus be avoided. Since the pinchcock can comprise solely a one-piece valve casing and a sleeve, its installation and, in particular, its maintenance can be attended to extremely simply and without special knowledge.

In a particularly preferred embodiment of the pinchcock according to the invention, projections spaced apart from each other in the circumferential direction and protruding outwards in the radial direction are arranged on the sleeve body, and in a first fastening region the valve casing has a holding surface which is intended to cooperate with the projections and behind which the projections can engage, preferably by the turning of the sleeve, after insertion of the sleeve into the passage. This permits a simple, space-saving bayonet connection and in which the sleeve body does not need to have recesses which impair its strength.

A particularly preferred embodiment of the pinchcock according to the invention has a fastening collar embedded in the sleeve body and has lugs forming the projections. The fastening collar can be made of a dimensionally stable material, for example metal or plastic material, and thus stiffens the sleeve body in the fastening region, so that the sleeve body retains its shape under all operating conditions.

Another preferred embodiment of the pinchcock according to the invention is one in which the valve casing has groove-like recesses which extend in the longitudinal direction of the passage and through which the projections can move on insertion of the sleeve into the passage, and the holding surface, viewed in the circumferential direction, is arranged between the recesses. This permits a particularly space-saving embodiment. The projections can here project in the radial direction as far as or further than the parts of the support arrangement which are arranged on the sleeve body.

Another preferred embodiment of the pinchcock, which permits reliably secure installation, is one in which the projections and the corresponding recesses have different configurations, and preferably have different dimensions in the circumferential direction, in order to determine the rotational position of the sleeve relative to the valve casing on insertion of the sleeve.

A preferred embodiment of the pinchcock according to the invention, which has a particularly simple, space-saving construction, is one wherein the support arrangement has a support element arranged on the sleeve body and projecting outwards in the radial direction, and also a support surface formed on the valve casing and intended to cooperate with the support element.

Another particularly preferred embodiment of the pinchcock according to the invention is one wherein the support element is formed by a circumferential flange of a holding collar embedded in the sleeve body. The holding collar can be made of an extremely dimensionally stable material, for example metal or a plastic material. It ensures not only secure seating of the sleeve, but also dimensionally stable holding of the sleeve body in the fastening region.

In a likewise preferred pinchcock in which the fastening collar is or are vulcanized into the sleeve body, a particularly strong, durable connection, resisting large forces, of the sleeve body to the holding collar and/or the fastening collar is ensured.

Since in another particularly preferred embodiment of the pinchcock according to the invention wherein the sleeve body passes through the passage and on each of its end faces has a sealing surface which is intended to cooperate with the face of a line part to be fastened to the valve casing, the sleeve body itself takes over sealing functions in relation to adjoining line parts and special sealing elements can be dispensed with, so that the construction is greatly simplified.

Another particularly preferred embodiment of the pinchcock according to the invention is one wherein the passage has in the fastening regions a substantially circular cross section and in a portion between the fastening regions has an oval cross section, and the sleeve can be held in the valve casing, by a securing means preventing rotation, in a rotational position such that its pinching plane at least approximately coincides with the largest dimension of the oval cross section. It permits the reduction of the control volume to a minimum, so that not only is little space required but savings in energy are also achieved. Furthermore, under operating pressure the elastic sleeve body is for the most part supported by the valve casing, so that its mechanical stressing is very slight because of extremely slight stretching, and thus its life is considerably lengthened.

The invention further includes a sleeve and a valve casing for a pinchcock according to the invention. The sleeve includes a sleeve body of elastic material, on which there are arranged, in a first fastening region, projections intended to form a bayonet connection to a valve casing and, in a second fastening region situated at a distance therefrom in the longitudinal direction, a support element. The valve casing includes an inlet, an outlet and a passage connecting said inlet and outlet to each other, comprising a holding surface arranged in a first fastening region and intended to form a bayonet connection to a sleeve arranged in the passage, and comprising a support surface arranged in a second fastening region situated at a distance therefrom in the longitudinal direction.

BRIEF DESCRIPTION OF THE DRAWINGS

The present invention will now be described in greater detail with the aid of an exemplary embodiment which is illustrated in the purely schematic drawings, in which:

FIG. 1 shows a pinchcock according to the invention in a longitudinal section in two sectional planes which are at right angles to one another and which in FIG. 2 are designated I—I;

FIG. 2 is a cross section through the pinchcock according to the invention, taken in a sectional plane designated II—II in FIG. 1;

FIG. 3 is a longitudinal section through a sleeve of the pinchcock according to the invention;

FIG. 4 is a section through the sleeve shown in FIG. 3, taken in a sectional plane designated IV—IV therein;

FIG. 5 shows a holding collar in longitudinal section;

FIG. 6 is an elevation of the holding collar shown in FIG. 5, and

FIG. 7 is an elevation of a fastening collar.

DESCRIPTION OF THE PREFERRED EMBODIMENTS

The flexible tubing pinchcock 10 shown in FIGS. 1 and 2 has a tubular valve casing 12, whose longitudinal axis is designated 12'. An inlet 14 is provided on the one end face of the valve casing 12 and an outlet 16 is provided on the other end face, said inlet and outlet being connected to one another by means of a passage 18 extending in the axial direction. A sleeve 20 inserted into the passage 18 has a tubular sleeve body 22 which has a substantially circular cross section and is made of elastic material and which extends through the entire length of the passage 18. The sleeve body 22 is fastened to the valve casing 12 by means of a bayonet connection 26 in a first fastening region 24 adjoining the inlet 14 and by means of a support arrangement 30 in a second fastening region 28 adjoining the outlet 16.

A control space designated 32 is bounded radially inwards by the sleeve body 22 and radially outwards by the valve casing 12. It is connected to a control valve through a control opening 34 in the valve casing 12 in a generally known manner.

The sleeve 20 will now be described in greater detail with reference to FIGS. 3 and 7. In a portion adjoining the one axial end of the sleeve body 22 there is embedded in the latter a fastening collar 36, which is made of a dimensionally stable material, preferably a metal, such as iron or steel. The one-piece fastening collar 36 comprises a cylinder part 38, which is closed upon itself in the circumferential direction, and at the one end a flange-like annular part 40 which is formed on said cylinder part and from which four lugs 42 spaced 90° apart in the circumferential direction protrude outwards in the radial direction. These lugs 42, which are arranged in a plane extending at right angles to the longitudinal axis 12', form projections 44 projecting outwards beyond the sleeve body 22 in the radial direction, as can be seen in particular in FIG. 4. The lug designated 42' is made wider, viewed in the circumferential direction, than the other three lugs 42, which have the same width. As can be seen in particular in FIG. 3, the cylinder part 38 and the annular part 40, which faces the end face of the sleeve body 22, are completely surrounded by the elastic material of the sleeve body 22 and connected to the latter by vulcanization.

FIGS. 5 and 6 show a holding collar 46, on the cylindrical collar part 48 of which a circumferential flange 50 is formed at one end. The radially outer edge of the flange 50 is at the same distance from the longitudinal axis 12' as the outer end of the lugs 42, 42'. The flange 50 thus has an annular region 50' projecting outwards in the radial direction beyond the sleeve body 22 and forms a support element 51. As shown in particular in FIG. 3, the holding collar 46 is embedded in the sleeve body 22 in the same way as the fastening collar 36 and, with the exception of the annular region 50', entirely surrounded by its material. Vulcanization ensures a particularly firm connection between the holding collar 46 and the sleeve body 22.

Two circumferential sealing beads 52 arranged side by side are formed on each of the two end faces of the sleeve body 22. When the sleeve 20 is installed in the valve casing 12 these sealing beads 52 are intended to bear against the face 54 of a pipe or apparatus part 56, to which the valve casing 12 is fastened by means of a bolt connection 58 and which forms an inlet or outlet line for the medium—see FIG. 1.

In each of the end regions adjoining the inlet 14 and outlet 16 respectively, the circular cross section of the passage 18 has a diameter substantially corresponding to the greatest diameter of the fastening collar 36 and holding collar 46. Each of these end regions is bounded in the axial direction toward the interior of the valve casing 12 by a respective circumferential shoulder 60. These shoulders 60 lead to a step-like reduction of the cross section of the passage 18 to a diameter which is slightly greater than the outside diameter of the sleeve body 22. Between the valve casing 12 and the sleeve body 22 a gap 62 is left, which, measured in the radial direction, is smaller than the distance to which the lugs 42 of the fastening collar 36 and the annular region 50' of the holding collar 46 project beyond the sleeve body 22. This gap 62 is part of the control space 32.

Grooves 64, 64' extending in the direction of the longitudinal axis 12' and open towards the passage 18 are formed in the valve casing 12 and are spaced 90° apart. The bottom 66 of the grooves 64, 64' is substantially in line with the peripheral surface of the passage 18 in the end regions adjoining the inlet 14 and outlet 16. Viewed in the circumferential direction, the grooves 64 and the groove 64' are made slightly wider than the lugs 42 and the lug 42' respectively. The width of the grooves 64 is in any case smaller than that of the lug 42'. Because of this configuration of the grooves 64, 64', it is ensured that the sleeve 20 is inserted in the correct position, with its end face adjoining the fastening collar 36 foremost, into the passage 18 of the valve casing 12.

Viewed in the circumferential direction, the shoulder 60 adjoining the inlet 14 forms between the grooves 64, 64' a holding surface 68, and similarly the shoulder 60 adjoining the outlet 16 forms a support surface 70. The holding surface 68 and the support surface 70 lie in planes extending at right angles to the longitudinal axis 12' and are spaced apart from one another by at least approximately the same distance as the lugs 42 and the flange 50.

For the installation of the sleeve 20 the latter can thus be pushed into the passage 18, in the direction of the longitudinal axis 12', until the annular region 50' of the flange 50 lies against the support surface 70. When the sleeve 20 is then turned about the longitudinal axis 12', preferably by 45°, the lugs 42 then engage behind the holding surface 68, whereby the sleeve 20 is fastened to the valve casing 12, at the inlet end 14 by means of a bayonet connection 26 formed by the lugs 42 or projections 44 and the holding surface 68, and at the outlet end by means of the support arrangement 30 formed by the support surface 70 and the annular region 50' of the holding collar 46 and the support element 51 respectively.

At the inlet end, a rollpin 72 is inserted into the valve casing 12 and projects beyond the holding surface 68 in the axial direction, serving as a stop for the lug 42'. Since the rollpin 72 is arranged next to the groove 64', it permits the turning of the sleeve 20, during its installation, only in the counterclockwise direction, as can be seen in FIG. 2. This turning movement is limited by means of another rollpin 74, which is likewise inserted into the valve casing 12 and projects beyond the holding surface 68 in the axial direction. When the lug 42' lies against the additional rollpin 74, on the side of the lug 42' remote therefrom, a locking pin 76 is inserted into a corresponding bore formed in the axial direction in the valve casing 12, so that the sleeve 20 is now held in a defined rotational position, shown in FIG. 2, by the additional rollpin 74 and the locking pin 76. For the purpose of replacing the sleeve 20 only the locking pin 76 has to be removed, so that by turning the sleeve 20 in the clockwise direction the lugs 42 and 42' can be brought into line with the corresponding grooves 64, 64', in order then to remove the sleeve 20 in the axial direction, with the end adjoining the holding collar 46 foremost, from the valve casing 12.

Before being installed, the sleeve bodies 22 are pressed together in a defined direction into a pinching plane 78. During operation the sleeve bodies 22 are then always deformed in the same direction from their circular position of rest. This property now enables the volume of the control space 32 to be kept as small as possible, in that the cross section of the passage 18 is enlarged solely in the pinching region of the sleeve body 22, that is to say in a middle region between the two fastening regions 24 and 28, in such a manner that the inside width of the passage 18, measured in the pinching plane 78, is slightly greater than the greatest width of the sleeve body 22 in that plane. Between the inner wall of the valve casing 12 and the pinched sleeve body 22 a gap 62' is advantageously left, its width corresponding approximately to that of the gap 62. The substantially tubular valve casing 12 therefore has bulges 80 on opposite sides in the middle region. In FIGS. 1 and 2 the pinched sleeve body 22 is shown in dot-dash lines.

Since, because of the different lugs 42, 42' and the arrangements on the valve casing 12—grooves 64 and 64', rollpins 72, 74 and locking pin 76—the installed position of the sleeve is accurately predetermined, said sleeve can also be pinched together in the correct direction before it is installed.

At its end face the control space 32 is bounded by the face 54 of the tube or apparatus parts 56 which are to be fastened to the valve casing 12. The face 54 lies sealingly in the radially inward direction against sealing beads 52 of the sleeve body 22 and in the radially outward direction against a sealing ring 82 which is inserted into a groove formed in the valve casing 12 and extending around the inlet 14 or outlet 16.

As long as the pressure in the control space 32 is lower than or equal to the pressure of the medium present in the sleeve body 22, the sleeve body 22 retains the position shown in solid lines in FIGS. 1 and 2 or, except in the region of the bulges 80 and grooves 64, 64', comes to lie against the inner wall of the valve casing 12. High pressures of the medium can have the consequence that the sleeve body 22 is slightly stretched in the region of the bulges 80. Since, however, the sleeve body 22 is for the most part supported by the valve casing 12, this stretching leads to only slight stressing of the sleeve body 22.

When the flow of medium is to be interrupted, the control space 32 is placed under a given pressure above that of the medium, whereby the sleeve body 22 is completely pinched together into the pinching plane 78. It is thereby gastightly closed and solids contained in the pinching region are enclosed by the highly elastic sleeve body 22. When the pressure in the control space 32 is reduced again to a value equal to or below that of the medium, the sleeve body 22 frees the full cross section again. It can be seen that selection of the pressure in the control space 32 also permits metering of the medium.

As can be seen particularly in FIG. 1, the medium in the pinchcock 10 comes into contact only with the inner peripheral surface of the sleeve body 22. It is therefore sufficient for the sleeve body to be provided, if desired, on its radially inner face with a protective coating appropriate for the medium; the remainder of the sleeve body 22 can always be made of the same material and have the same construction.

The control medium used may be compressed air, water, oil or the like.

As is clear from FIGS. 1 and 2, the valve casing 12 has external fastening flanges 84 at both ends. It is obviously also possible for the valve casing 12 to be connected to the adjoining parts in a different way, for example by means of a screw thread connection.

More or fewer than four lugs 42, 42' or projections 44 and corresponding grooves 64, 64' can of course be provided. For the purpose of fixing the rotational position of the sleeve 20 on its installation, it is also conceivable for the lugs 42, 42' or projections 44 and the corresponding grooves 64, 64' to have an irregular distribution, viewed in the circumferential direction. In this case all the lugs and grooves could have the same width.

It is also conceivable for cam-like projections 44, which take over the function of the lugs 42, 42', to be formed on the sleeve body 22 itself. It is similarly conceivable for a support element 51, for example a circumferential bead, which takes over the function of the annular region 50', to be formed on the sleeve body 22 itself.

The terms "inlet" 14 and "outlet" 16 are not to be understood as meaning that the medium can flow through the pinchcock 10 only from the inlet side. It is obviously also possible for the medium to flow oppositely to the direction of flow D, so that the inlet 14 becomes the outlet and the outlet 16 becomes the inlet.

It is also conceivable for the holding collar 46 to be of the same design as the fastening collar 36, that is to say to have projecting lugs. In this case it is advantageous to arrange the two collars to be rotationally offset by a certain angle relative to each other, so that when the sleeve 20 is inserted the lugs of the holding collar come to bear against the support surface 70 and, when the inserted sleeve 20 is turned, remain bearing against the support surface 70.

As can be seen in FIG. 1, when the control space 32 is pressurized the pinched sleeve body 22 is subjected to the action of forces which act in the direction of the longitudinal axis 12' and which counteract the tensile force exerted on the fastening and holding collars 36, 46 through the pinching action. In addition, this pressurization presses the sleeve body 22 in the radial direction against the fastening and holding collars 36, 46 in the region of their overlap. The first-mentioned forces reduce the stress on the connection between the sleeve body 22 and the fastening or holding collar 36, 46, and the second force supports this connection.

It is also possible to connect the fastening and holding collars 36, 46 to the sleeve body 22 in a different way. Thus, it is conceivable for these collars to be provided with through holes through which material of the sleeve body 22 passes.

I claim:

1. A pinchcock comprising a valve casing which has an inlet, an outlet and a passage connecting said inlet and outlet to each other, comprising a sleeve which is arranged in the passage and has a sleeve body of elastic material and which is intended to receive the flow of a medium passing through it from the inlet to the outlet or vice versa, comprising means for fastening the sleeve body to the valve casing in two fastening regions situated at a distance from one another in the longitudinal direction of the passage, and comprising a control space which is bounded by the valve casing and the sleeve body and which, for the purpose of pinching together the sleeve body (22) between the two fastening regions, can be placed under a pressure higher than that of the medium, wherein the sleeve body is fastened to the valve casing by means of a bayonet connection in a first fastening region and by means of a support arrangement in the other, second fastening region, the bayonet connection and the support arrangement acting in opposite directions pointing away from one another.

2. A pinchcock as claimed in claim 1, wherein projections spaced apart from each other in the circumferential direction and protruding outwards in the radial direction are arranged on the sleeve body, and in the first fastening region the valve casing has a holding surface which is intended to cooperate with said projections and behind which the projections can engage, preferably by the turning of the sleeve, after insertion of the sleeve into the passage.

3. A pinchcock as claimed in claim 2, which has a fastening collar embedded in the sleeve body and having lugs forming the projections.

4. A pinchcock as claimed in claim 2, wherein the valve casing has groove-like recesses which extend in the longitudinal direction of the passage and through which the projections can move on insertion of the sleeve into the passage, and the holding surface, viewed in the circumferential direction, is arranged between the recesses.

5. A pinchcock as claimed in claim 4, wherein projections and the corresponding recesses have different configurations, and preferably have different dimensions in the circumferential direction, in order to determine the rotational position of the sleeve relative to the valve casing on insertion of the sleeve.

6. A pinchcock as claimed in claim 1, wherein the support arrangement has a support element arranged on the sleeve body and projecting outwards in the radial direction, and also a support surface formed on the valve casing and intended to cooperate with said support element.

7. A pinchcock as claimed in claim 6, wherein the support element is formed by a circumferential flange of a holding collar embedded in the sleeve body.

8. A pinchcock as claimed in claim 3, wherein the fastening collar is or are vulcanized into the sleeve body.

9. A pinchcock as claimed in claim 1, wherein the sleeve body passes through the passage and on each of its end faces has a sealing surface which is intended to cooperate with the face of a line part to be fastened to the valve casing.

10. A pinchcock as claimed in claim 1, wherein the passage has in the fastening regions a substantially circular cross section and in a portion between the fastening regions has an oval cross section, and the sleeve can be held in the valve casing, by a securing means preventing rotation, in a rotational position such that its pinching plane at least approximately coincides with the largest dimension of the oval cross section.

11. A sleeve for a pinchcock as claimed in claim 1, comprising a sleeve body of elastic material, on which there are arranged, in a first fastening region, projections intended to form a bayonet connection to a valve casing and, in a second fastening region situated at a distance therefrom in the longitudinal direction, a support element.

12. A valve casing for a pinchcock as claimed in claim 1, comprising an inlet, an outlet and a passage connecting said inlet and outlet to each other, comprising a holding surface arranged in a first fastening region and intended to form a bayonet connection to a sleeve arranged in the passage, and comprising a support surface arranged in a second fastening region situated at a distance therefrom in the longitudinal direction.

13. A pinchcock as claimed in claim 3, wherein the support arrangement has a support element arranged on the sleeve body and projecting outwards in the radial direction, wherein the support element is formed by a circumferential flange of a holding collar embedded in the sleeve body, and also a support surface formed on the valve casing and intended to cooperate with said support element.

14. A pinchcock as claimed in claim 13, wherein the valve casing has groove-like recesses which extend in the longitudinal direction of the passage and through which the projections can move on insertion of the sleeve into the passage, and the holding surface, viewed in the circumferential direction, is arranged between the recesses.

* * * * *